US007627894B2

(12) United States Patent
Kiss et al.

(10) Patent No.: US 7,627,894 B2
(45) Date of Patent: Dec. 1, 2009

(54) METHOD AND SYSTEM FOR AUTHORIZING ACCESS TO USER INFORMATION IN A NETWORK

(75) Inventors: Krisztian Kiss, Del Mar, CA (US); Markku Tuohino, Espoo (FI); Ilkka Westman, Helsinki (FI)

(73) Assignee: Nokia Corporation, Espoo (FI)

( * ) Notice: Subject to any disclaimer, the term of this patent is extended or adjusted under 35 U.S.C. 154(b) by 833 days.

(21) Appl. No.: 10/739,138

(22) Filed: Dec. 19, 2003

(65) Prior Publication Data

US 2005/0071679 A1    Mar. 31, 2005

Related U.S. Application Data

(60) Provisional application No. 60/444,687, filed on Feb. 4, 2003.

(51) Int. Cl.
*H04L 29/00* (2006.01)

(52) U.S. Cl. ............................................. 726/5; 726/27

(58) Field of Classification Search ........................ None
See application file for complete search history.

(56) References Cited

U.S. PATENT DOCUMENTS

| | | | | |
|---|---|---|---|---|
| 6,253,202 | B1 * | 6/2001 | Gilmour | 707/9 |
| 6,754,482 | B1 * | 6/2004 | Torabi | 455/410 |
| 6,938,090 | B2 * | 8/2005 | Isomaki | 709/229 |
| 2002/0143961 | A1 * | 10/2002 | Siegel et al. | 709/229 |
| 2005/0204030 | A1 * | 9/2005 | Koch et al. | 709/223 |

OTHER PUBLICATIONS

"3GPP TS 24.229 v5.3.0—IP Multimedia Call Control Protocol based on SIP and SDP", 3GPP, Dec. 2002, Retrieved from the Internet on Jun. 22, 2007: <URL: http://www.3gpp.org/ftp/Specs/html-info/24229.htm>.*
Rosenberg, "A Session Initiation Protocol (SIP) Event Package for Registrations", IETF, Oct. 2002, Retrieved from the Internet on Jun. 22, 2007: <URL: http://tools.ietf.org/html/draft-ietf-sipping-reg-event-00#section-4.6>.*
Roach, "RFC 3265—Session Initiation Protocol (SIP)—Specific Event Notification", Network Working Group, Jun. 2002, Retrieved from the Internet on Jun. 22, 2007: <URL: http://tools.ietf.org/html/rfc3265>..*

(Continued)

*Primary Examiner*—Gilberto Barron, Jr.
*Assistant Examiner*—M. D.
(74) *Attorney, Agent, or Firm*—Ditthavong Mori & Steiner, P.C.

(57) ABSTRACT

The present invention is directed to a method and system for authorizing access to information of a user. The system includes a first network entity and a second network entity. The first network entity sends a request for information of a user to the second network entity. The second network entity receives the request for information of the user, verifies that the first network entity is authorized to receive the requested information, and generates a response authorizing the request if the first network entity is authorized to receive the information. The verifying may include comparing the first network entity against all non-barred public user identities of the user, comparing the first network entity against all network entities identified in a previous request, and comparing the first network entity against all application servers not belonging to third-party providers outside a network to which the user is connected.

34 Claims, 8 Drawing Sheets

OTHER PUBLICATIONS

"3GPP TS 23.228 v5.6.0—IP Multimedia Subsystem (IMS)", 3GPP, Sep. 2002, Retrieved from the Internet on Dec. 10, 2007: <URL: http://www.3gpp.org/ftp/Specs/html-info/23228.htm>.*

"3GPP Ts 24.229 v 5.3.0 — IP Multimedia Call Control Protocol Based on SIP and SDP", 3GPP, Dec. 2002, pp. 17, 27, 38, 42 and 48.

* cited by examiner ated device to receive information about the user's
METHOD AND SYSTEM FOR AUTHORIZING ACCESS TO USER INFORMATION IN A NETWORK This application claims the benefit of U.S. Provisional patent application No. 60/444,687, filed Feb. 4, 2003, the contents of which is expressly incorporated by reference herein in its entirety.

BACKGROUND

1. Field of the Invention

This invention relates to networks, and more specifically to authorizing access to user information in a network or system.

2. Background Information

Devices and entities on networks generally communicate among each other regularly, sending instructions and/or data. Before a first network device would send information to a second network device about a user's status, the first network device must make sure that the second network device is an authorized device to receive information about the user's status. In some networks, users must register with a network entity, therefore, this network entity is sent information about the user and its current registration with the network. Network devices desiring to receive information about users' registration state information may then access the network entity containing the information to determine that the user is actually registered or not. Further, the network entity performs an authorization process after a successful authentication process whereby a network device requesting the information of certain user(s) is verified to determine that the requesting network device is authorized to receive the information of the user(s). If the first network device is not authorized, then the network entity may not send the user's registration state information to the first network device. If the first network device is authorized to receive information of the user's registration state information, the network entity may then forward this information to the first network device.

One example of this is in Third Generation Partnership Project International Mobile Subscriber Internet Protocol Multimedia Subdomain (3GPP IMS) release 5 networks that use the Session Initiation Protocol (SIP) registration state event package to inform network devices about the state of the registration of the subscribers to the event package. 3GPP IMS Release 5 uses the SIP registration state event package to inform about the state of the registration to the subscribers of the event package. All SIP event packages, including the registration state event package, require authentication and authorization of the SIP SUBSCRIBE requests before accepting them by the notifier (receiver of the request). In 3GPP IMS Release 5, authentication is solved during registration, the Proxy Call State Control Function (P-CSCF) always inserts a trustable identity of the user to all subsequent SIP requests.

However, current Rel-5 networks/systems do not provide any authorization solution for the registration state event package. Rel-5 specifications restrict the list of authorized subscribers to be the user whose registration state is in question and the P-CSCF, which all SIP communication of the particular user is transferring through. The actual solution of how the Serving Call State Control Function (S-CSCF) (notifier of the event package) decides, whether the source of the SIP SUBSCRIBE request is authorized, is left undefined. Without authorization, any user can subscribe to somebody else's registration state and receive the status of all the public user identities of that particular user, or an address of record, public address, etc. of the user.

SUMMARY OF THE INVENTION

The present invention is directed to a method and system for authorizing access to information of a user. The system includes a first network entity and a second network entity. The first network entity sends a request for information of a user to the second network entity. The second network entity receives the request for information of the user, verifies that the first network entity is authorized to receive the requested information, and generates a response authorizing the request if the first network entity is authorized to receive the information. The verifying may include comparing the first network entity against all non-barred public user identities of the user, comparing the first network entity against all network entities identified in a previous request (e.g. network entities found in the Path header field of the REGISTER request in 3GPP IMS Release 5), and comparing the first network entity against all application servers not belonging to third-party providers outside a network to which the user is connected.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
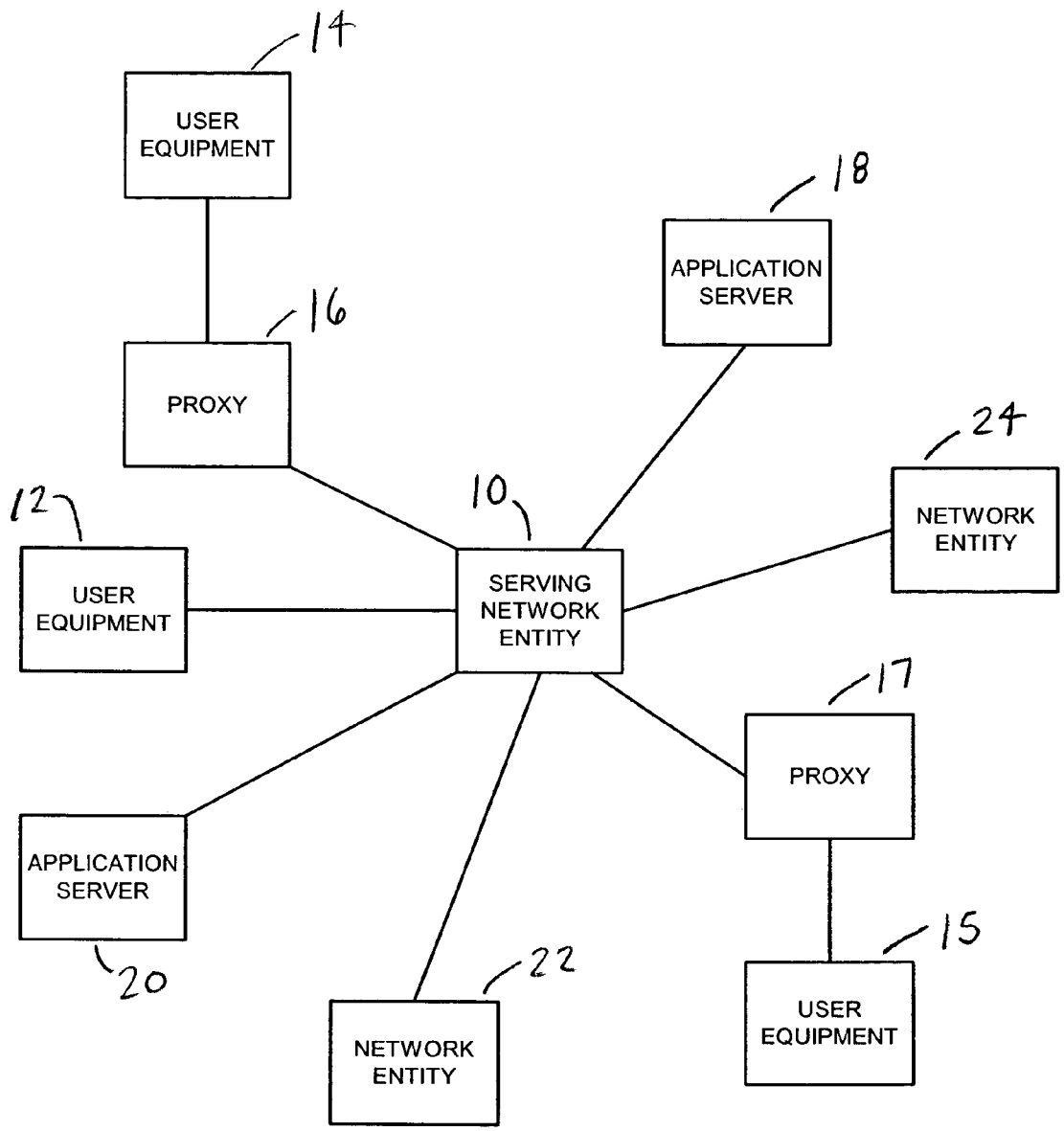
FIG. 1 is a system for authorizing access to user state information according to an example embodiment of the present invention.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions stored on a computer readable medium can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to method and system for authorizing access to information of a user. User equipment of the user may be connected to a network or system with other network devices and network entities. The network devices or entities may be any type of network devices such as other user equipment, servers, proxies, gateways, routers, terminals, etc. One or more network entities in the network may contain information regarding users and/or user equipment's state in the network. Other network devices or entities may desire to obtain the information about a particular user's state and, therefore, may request access to this information from a serving network entity containing (e.g., storing) the user's state. The serving network entity may then verify that the source of the request is authorized to receive the information of the user, and if so, the serving network entity may then generate a response authorizing the request and providing the user's state information to the requesting network device or entity. Authorization may include comparing information in the request identifying the requester with information stored at the serving network entity of network devices/entities authorized to access the information of the particular user. The information of network devices/entities authorized to access the information of the particular user may be initially loaded and stored at the serving network entity during network/system initialization or network entity initialization and/or may be dynamically sent to the serving network entity and/or modified during network/system operation.

User equipment may be any type network device, fixed or wireless, that may have an associated user such as, for example, a terminal, computer, wireless phone, server, Personal Digital Assistant (PDA), portable computer, etc. Moreover, the information of the user may include many types of information, for example, registration information, user identifications, user location, user equipment type, user equipment capabilities, etc.

FIG. 1 shows a system for authorizing access to user state information according to an example embodiment of the present invention. The system includes a serving network entity 10 that may receive and store information regarding one or more users, and receive requests for this information. The system may also include many other types of network or system devices that may send or request information from serving network entity 10 such as, for example, user equipment 12, user equipment 14, 15, through proxies 16, 17, application servers or other servers 18, 20, or other network entities 22, 24.

User equipment 12 may desire to access information regarding itself or another user, e.g., user equipment 14. User equipment 12 may then request this information from serving network entity 10, whereby serving network entity 10 verifies that user equipment 12 is authorized to receive the information of user equipment 14, and if so, forwards the information to user equipment 12. In some systems, there may be user equipment that only interfaces to serving network entity 10 through a proxy or other device 16. In this example scenario, user equipment 14 desiring user information of another user, or itself, may send a request to proxy 16 which then forwards the request to serving network entity 10. Serving network entity 10, after verifying user equipment 14 is authorized to receive the requested information, may then forward the requested information to proxy 16, which then in turn forwards it to user equipment 14. Similarly, application servers 18, 20 or other network entities 22, 24 may desire information of another or itself user and forward a request directly to serving network entity 10 whereby their request is verified as to being authorized to receive the information, and if authorized, the requested information forwarded to the application server or network entity accordingly.

Figure 2:
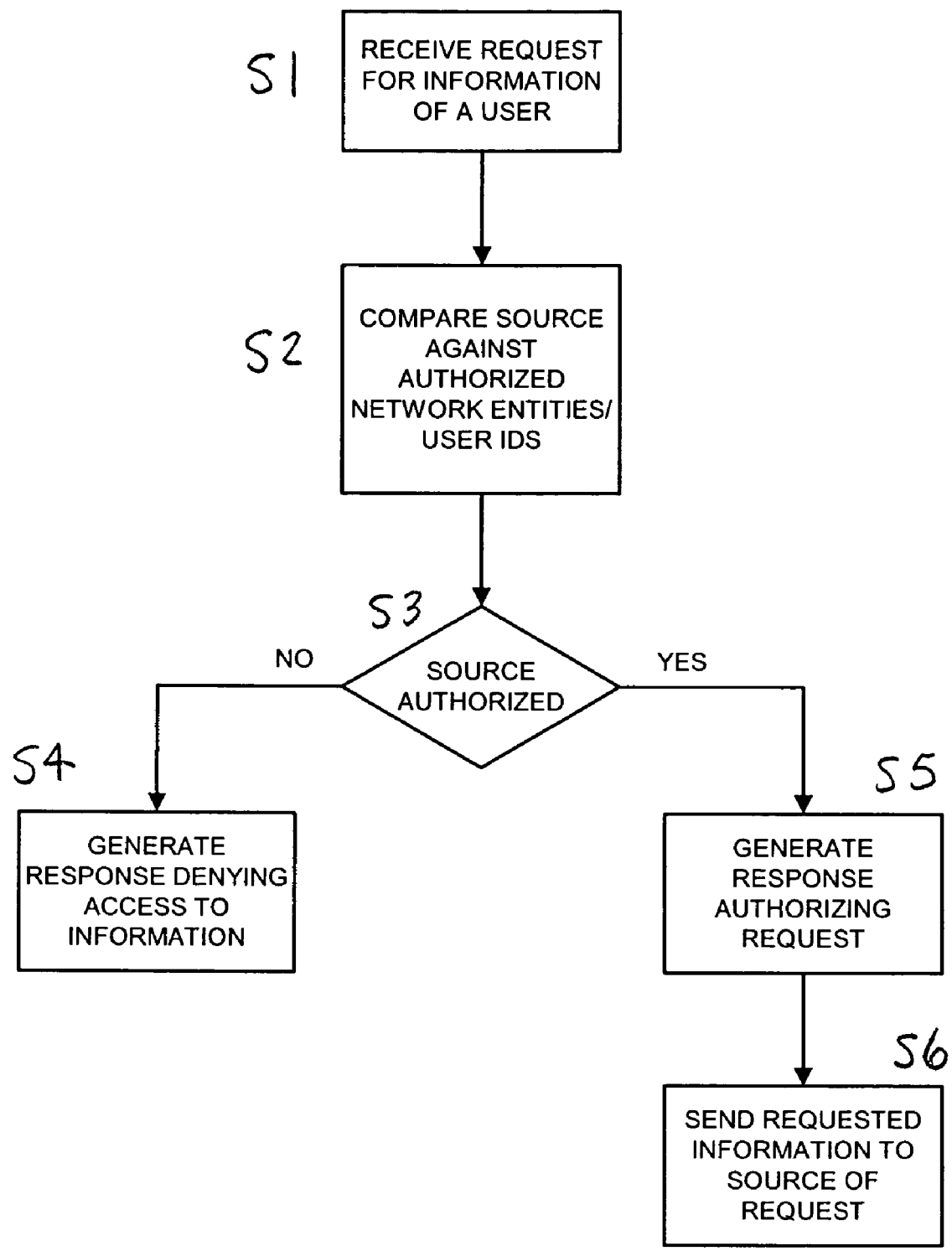
FIG. 2 is a flowchart of an example process for authorizing access to user state information in a network according to an example embodiment of the present invention.

FIG. 2 shows a flowchart of an example process for authorizing access to user state information in a network according to an example embodiment of the present invention. A request for information of a user is received S1. The source of the request may be compared against network entities and/or user identifications authorized to receive the requested information of the user S2. It may then be determined if the source is authorized to receive the requested information S3 and if not, a response may be generated denying access to the requested information of the user S4. If the source is authorized, a response may be generated authorizing the request S5 and the requested information forwarded to the source of the request S6.

Figure 3:
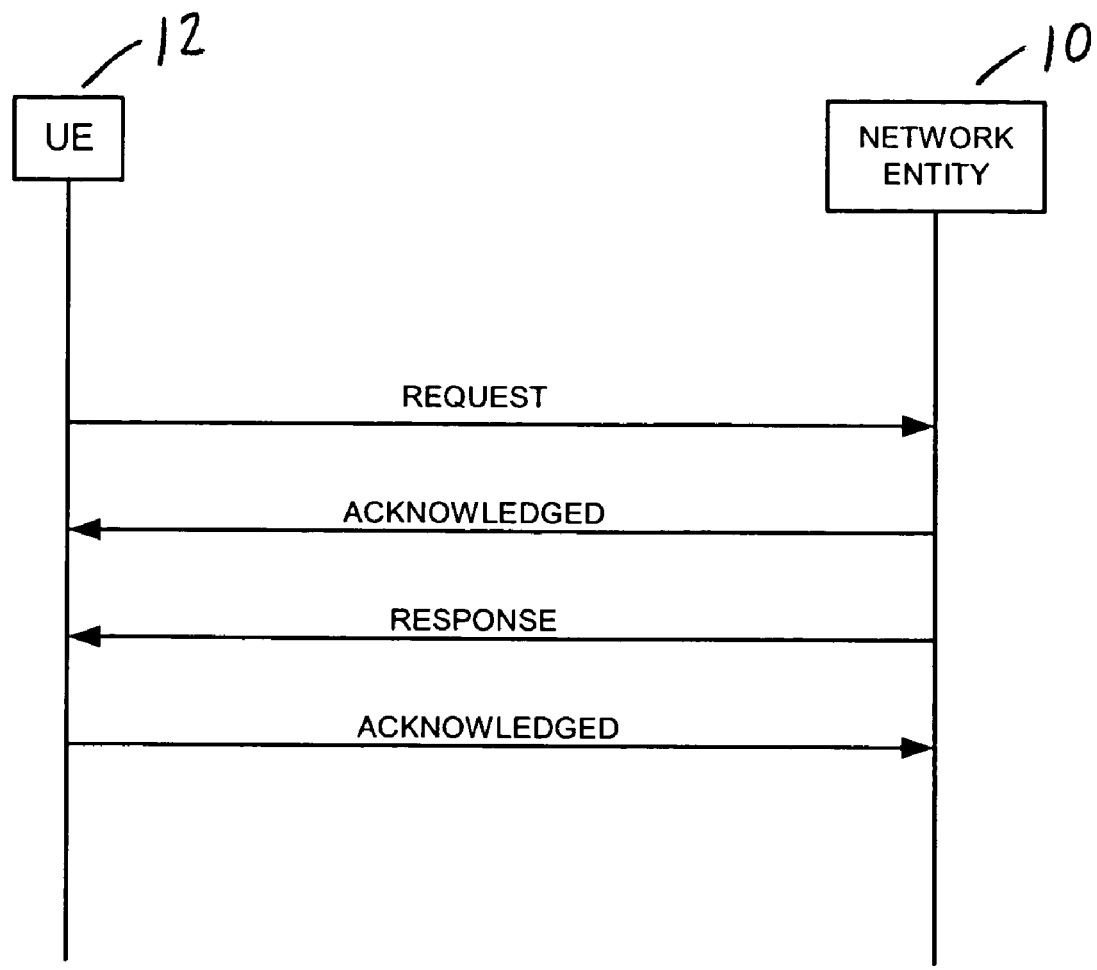
FIG. 3 is a signaling diagram of user equipment making a request for user state information according to an example embodiment of the present invention.

FIG. 3 shows a signaling diagram of user equipment making a request for user state information according to an example embodiment of the present invention. User equipment 12 may send a request to a network entity 10 requesting information of a user. The network entity 10 may then send an acknowledge message to user equipment 12 acknowledging receipt of the request. Network entity 10 may verify that user equipment 12 is authorized to receive the requested information by comparing information in the request with information stored at the serving network entity 10. If authorized, network entity 10 may send a response notifying user equipment 12 of this fact and also may send the requested user information via the response and/or a separate response. The user equipment 12 may then acknowledge receipt of the response.

Figure 4:
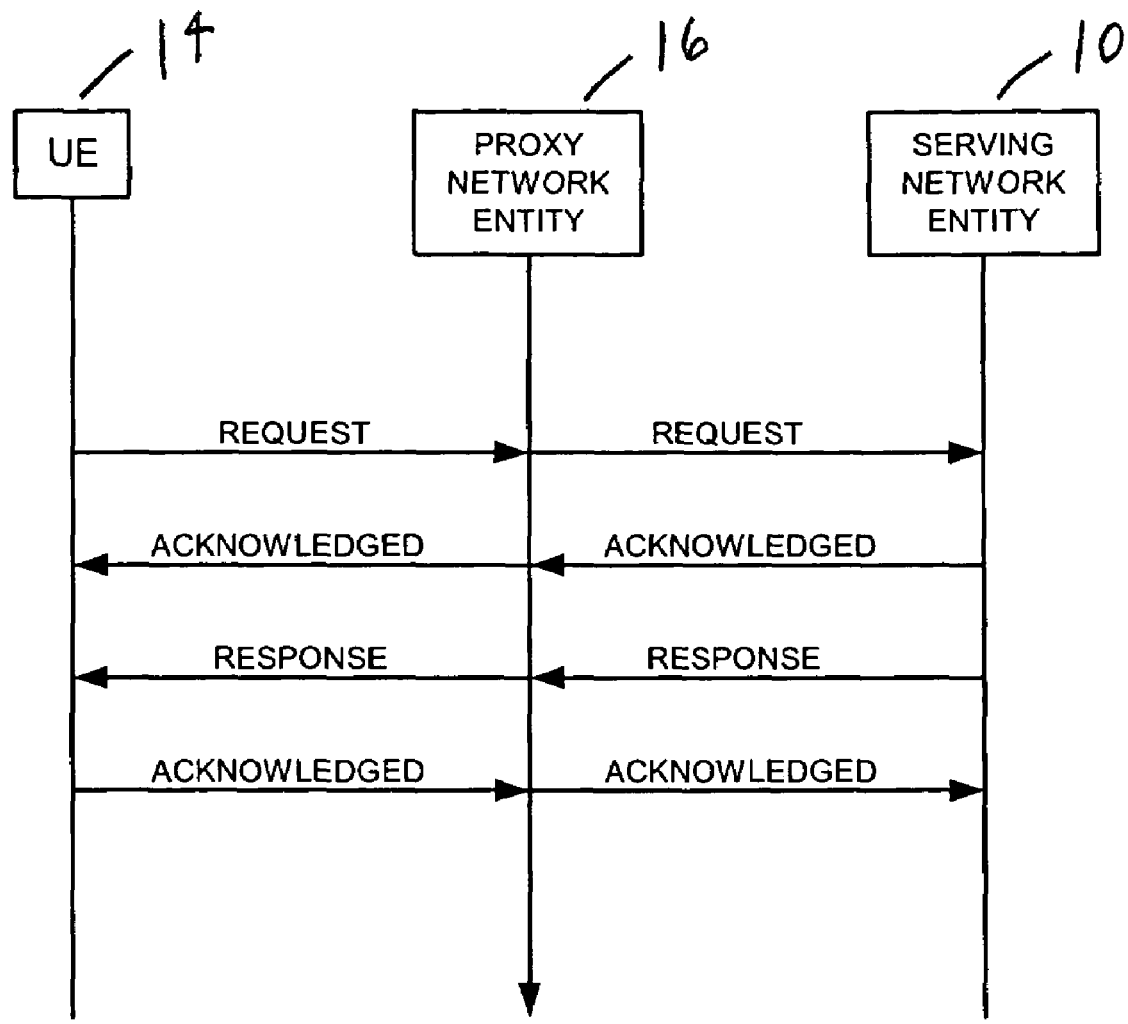
FIG. 4 is a signaling diagram of user equipment sending a request for user state information via a proxy according to an example embodiment of the present invention.

FIG. 4 shows a signaling diagram of user equipment sending a request for user state information via a proxy according to an example embodiment of the present invention. In this example embodiment, user equipment 14 may interface with serving network entity 10 via a proxy network entity 16. Therefore, user equipment 14 may send a request for user information to proxy network entity 16, which then in turn forwards this request to serving network entity 10. Serving network entity 10 may then send an acknowledge message to user equipment 14 through proxy network entity 16 acknowledging receipt of the request for information. The serving network entity 10 checks to see if the user equipment 14 is authorized to receive the user information by comparing information in the request with information stored at the serving network entity 10, and may send a response to user equipment 14 via proxy network entity 16 either granting or denying access to the information. If the access is granted, the response may also include some or all of the requested information. The user equipment 14 may then send an acknowledge to serving network entity 10 through proxy network entity 16 acknowledging receipt of the response.

Figure 5:
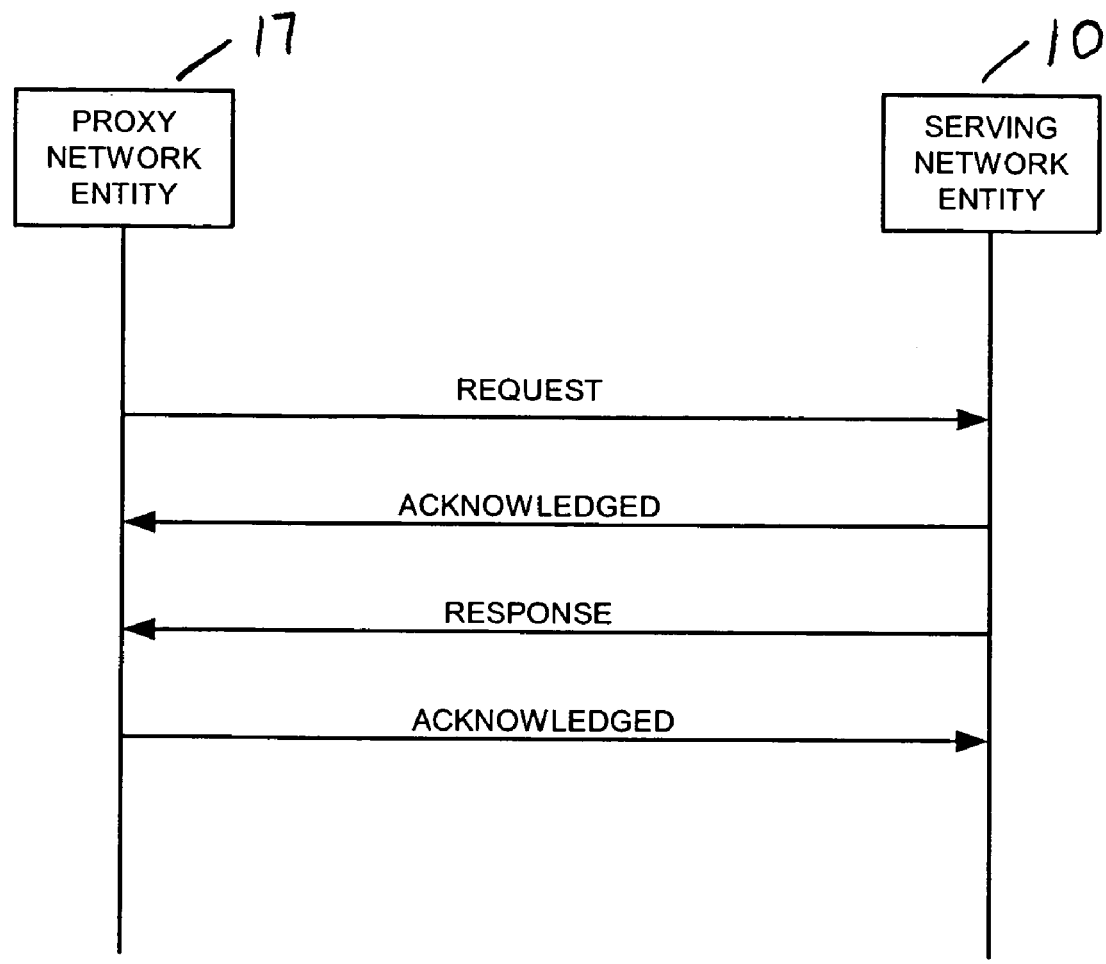
FIG. 5 is a signaling diagram of a proxy sending a request for information on a user according to an example embodiment of the present invention.

FIG. 5 shows a signaling diagram of a proxy sending a request for information on a user according to an example embodiment of the present invention. Proxy network entity 17 may send a request to a network entity 10 requesting state information of a user. The network entity 10 may then send an acknowledge message to proxy network entity 17 acknowledging receipt of the request. Network entity 10 may verify that proxy network entity 17 is authorized to receive the requested information by comparing information in the request with information stored at the serving network entity 10. If authorized, network entity 10 may send a response notifying proxy network entity 17 of this fact and also may send the requested user information via the response and/or a separate response. The proxy network entity 17 may then acknowledge receipt of the response.

Figure 6:
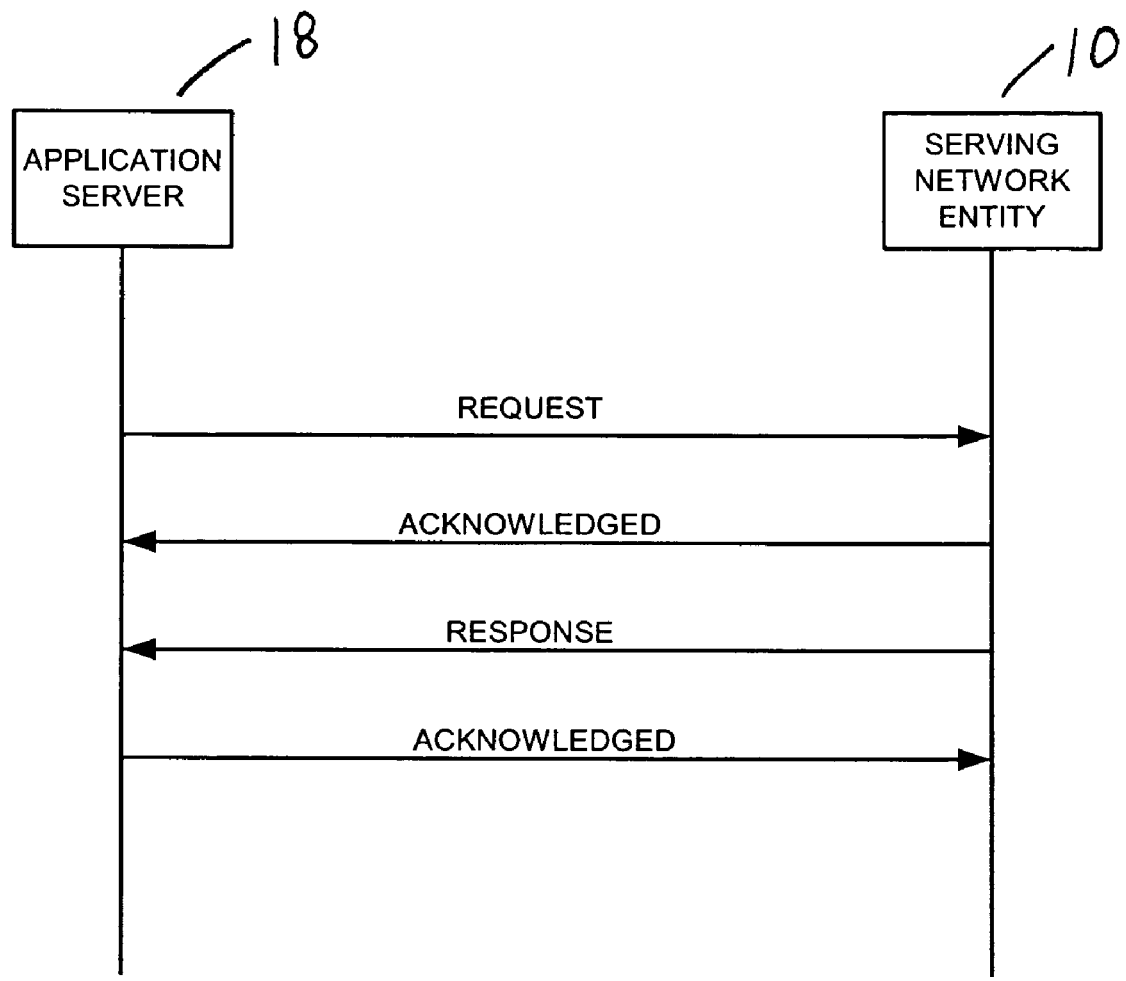
FIG. 6 is a signaling diagram of an application server sending a request for user state information according to an example embodiment of the present invention.

FIG. 6 shows a signaling diagram of an application server sending a request for user state information according to an example embodiment of the present invention. Application server 18 may send a request to a network entity 10 requesting information of a user. The network entity 10 may then send an acknowledge message to application server 18 acknowledging receipt of the request. Network entity 10 may verify that application server 18 is authorized to receive the requested information by comparing information in the request with information stored at the serving network entity 10. If authorized, network entity 10 may send a response notifying application server 18 of this fact and also may send the requested user information via the response and/or a separate response. The application server 18 may then acknowledge receipt of the response.

Figure 7:
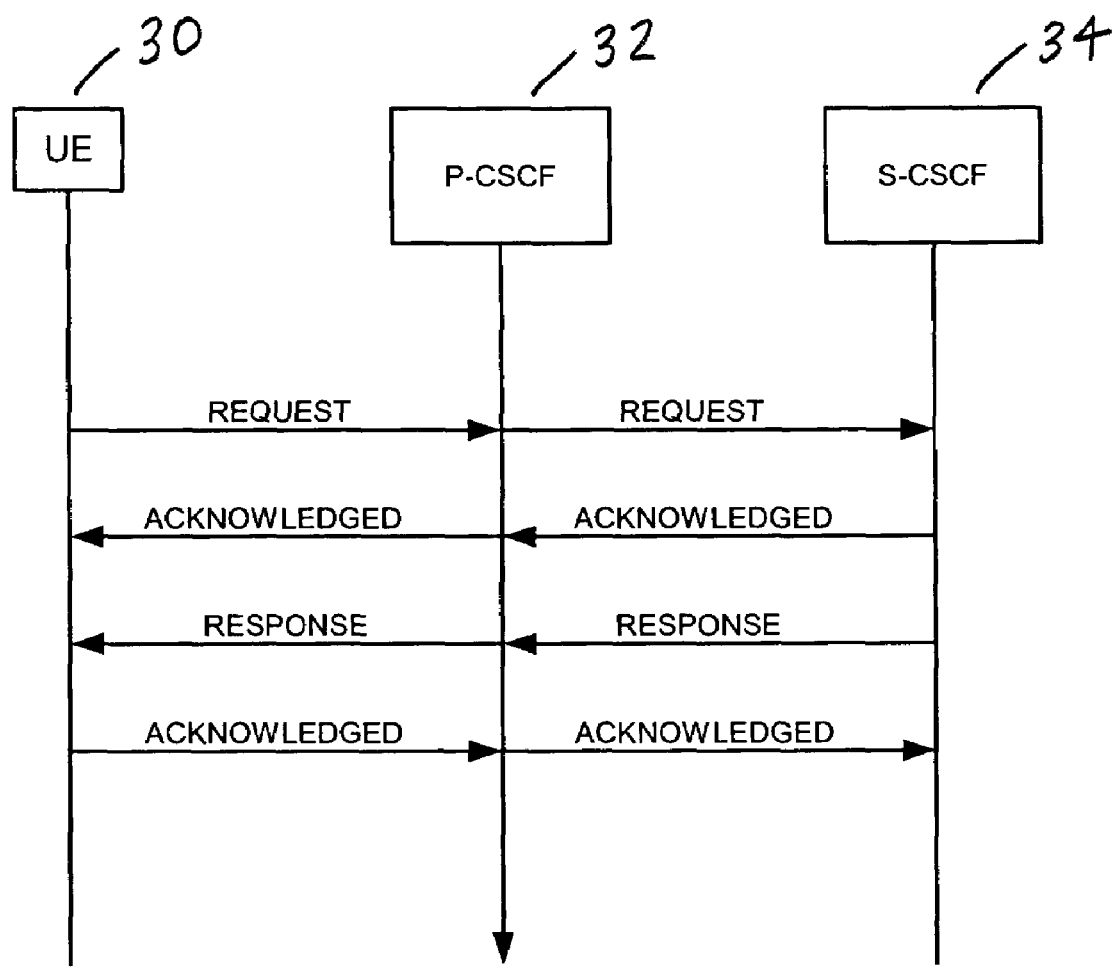
FIG. 7 is a signaling diagram of authorizing access to user information in a 3GPP IMS network according to an example embodiment of the present invention.

FIG. 7 shows a signaling diagram of authorizing access to user information in a 3GPP IMS network according to an example embodiment of the present invention. In this example embodiment, the user equipment may send a request to a serving network identity that is a Serving Call Session Control Function (S-CSCF) via a Proxy Call Session Control Function (P-CSCF). In this example embodiment of the present invention, the request may be a request for subscription to a registration state event package of a user. User equipment may make this request, a P-CSCF may make this request on its own, or a application server or other network entity may make this request to the S-CSCF.

Upon receiving the request for subscription information, a serving call state control function may then send an acknowledge message to the user equipment via the proxy call state control function acknowledging receipt of the request. The serving call state control function may then verify that the user equipment is authorized to receive the registration state event package of the requested user. In this example embodiment of the present invention, authorized sources of the request may include all non-barred public user IDs of the user, all entities that have been included in a PATH header field previously sent to the serving call state control function in a previous REGISTER request, and all application servers not belonging to third party providers. These application servers may also match a user's profile for the event. Authorization of the request for subscription information by the S-CSCF may include comparing information in the request with the authorized sources.

If the source of the request is not authorized, the serving call state control function may bar access to the user's subscription information. If the source of the request is authorized, the serving call state control function may generate a response acknowledging the subscribe request and indicating that the authorized subscription was successful. Furthermore, the response may include an Expires header which contains the same or a decreased value as an Expires header in the subscribe request, and/or a Contact header which is an identifier generated within the serving call state control function that helps to correlate refreshes for the subscribe. Afterwards, the serving call state control function may perform the procedures for notification about registration state as described in the 3GPP IMS specifications.

The authorized application servers may include application servers mentioned in a filter criteria associated with a previous REGISTER request. The filter criteria may be a rule, part of a subscriber information used to choose or select those application servers that are visited by the user. The serving call state control function may be aware of all non-barred public user IDs of each user, entities included in received PATH header fields, and all application servers not belonging to third party providers, before receiving any request for the registration state event package of a user. Moreover, the serving call state control function may also be aware of other non-registered user IDs of a user.

Therefore, in this example embodiment of the present invention, all SIP event package subscriptions (SIP SUBSCRIBE) must be authenticated and authorized before they are accepted by the notifier (i.e., S-CSCF). According to proposes a method, according to which network entities (e.g., servers) that are allowed to subscribe to the registration state event package may be picked from a Path header field of a Session Initiation Protocol (SIP) REGISTER request.

According to this embodiment of the present invention, the S-CSCF may use certain elements of the SIP registration for the purposes of authorization of the registration state event package. The elements may include the user's public user identity and the Path list received in REGISTER request. The path list represents those servers in the path of the SIP REGISTER request, which are interested to receive future SIP communication towards the user. Thus, those servers might store information related to user's registration. As a consequence, the servers, part of the path list, should be authorized subscribers of the user's registration state event package.

Therefore, this embodiment of the present invention provides authorization of the registration state event package for a S-CSCF when the notifier (i.e. the element that will send the respective NOTIFY to the SUBSCRIBE, i.e. S-CSCF) receives the SUBSCRIBE request for a particular user's registration state event package. After verifying the source of the SUBSCRIBE request (by means of checking the P-Asserted-Identity header field), the notifier may check the source of the SUBSCRIBE request against the path list and the user's public user identities. The subscription gets authorized only if there is a match.

Figure 8:
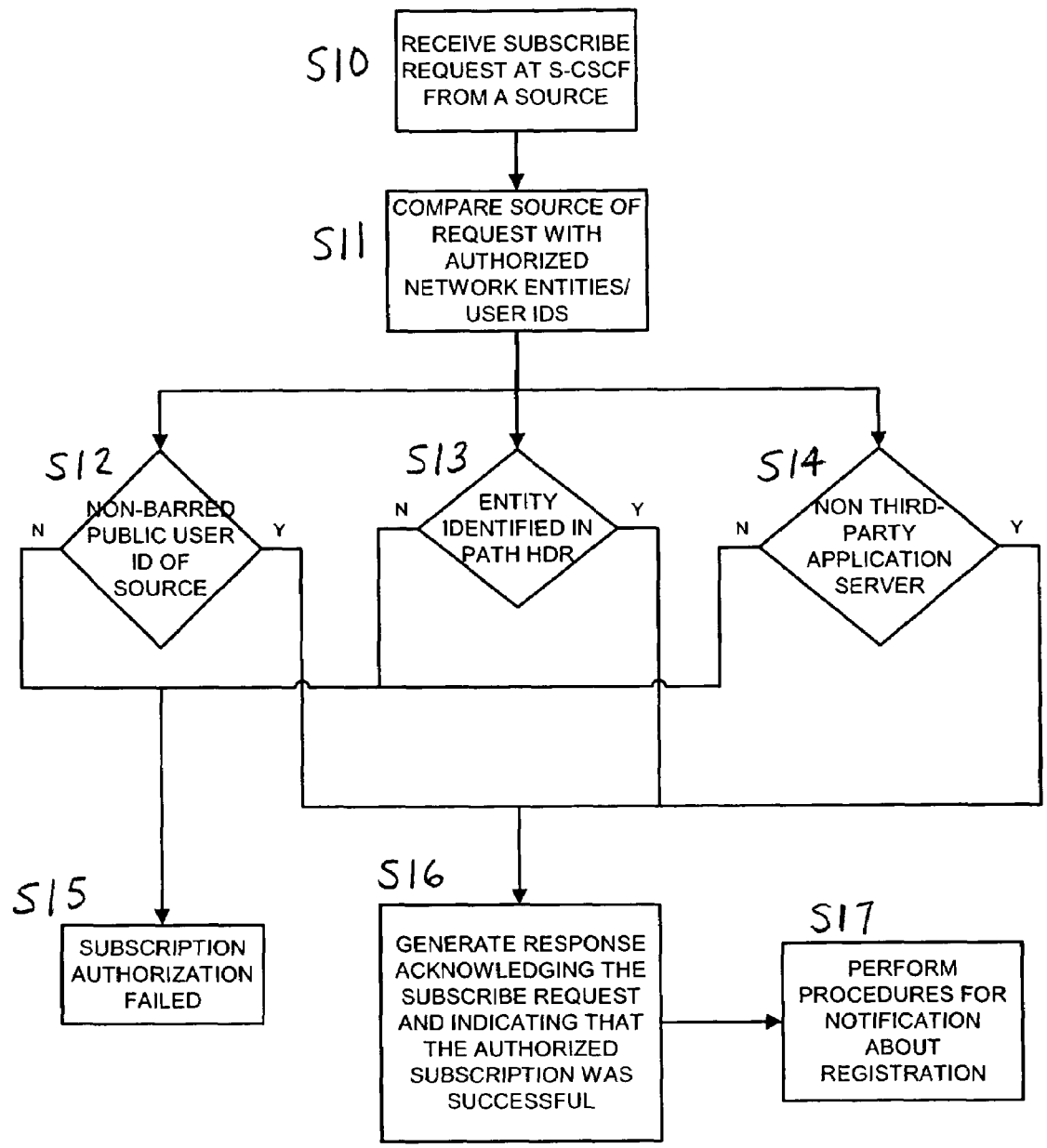
FIG. 8 is a flowchart of an example process for authorizing subscribers for a registration state event package of a user according to an example embodiment of the present invention

FIG. 8 shows a flowchart of an example process for authorizing subscribers for a registration state event package of a user according to an example embodiment of the present invention. A subscription request from a source is received at a serving call state control function S10. The serving call state control function compares information in the request with stored information of authorized subscribers (i.e., network entities and user identities) S11. The authorized subscribers may include all non-barred public user identities that user of the source of the request owns and that the S-CSCF is aware of, all entities identified by a PATH header field sent in a previous REGISTER request, or all application servers not belonging to third-party providers. It is determined if the source of the request is a non-barred public user identity S12, an entity identified by a PATH header field send in a previous SIP REGISTER request S13, or an application servers not belonging to third-party providers S14. If the source of the request is none of these, the source is not authorized to receive the requested information, and the serving call state control function may send a response stating that the subscription authorization has failed S15. If the source of the request is one of these, the serving call state control function may generate a response acknowledging the subscribe request and indicating that the authorized subscription was successful S16 and then perform procedures for notification about registration S17.

The present invention is advantageous since it allows performance of an authorization decision based on stored dynamic data in S-CSCF, and does not require pre-configured static address tables (e.g. the address of all P-CSCFs of the roaming partners). Moreover, the present invention allows authorization to information of a user to other network entities and not just other public user identities of the user.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method comprising:
   receiving a request at a network entity from a source for information of a user;
   verifying, by the network entity, that the source is authorized to receive the information; and
   generating, by the network entity, a response authorizing the request if the source is authorized to receive the information,
   wherein the verifying further comprises comparing the source of the request against non-barred public user identities of the user and comparing the source of the request against network entities identified in a path header contained in a previous request.

2. The method according to claim 1, wherein the information is registration information of the user.

3. The method according to claim 1, further comprising verifying that the network entity is authorized to receive the information based on stored dynamic information at the network entity and information in the request.

4. The method according to claim 1, wherein the request comprises a request for subscription to a registration state event package.

5. The method according to claim 1, wherein the path header field includes proxy call session control function (P-CSCF) devices to which the user is attached.

6. The method according to claim 1, the verifying further comprising comparing the source of the request against application servers not belonging to third-party providers outside a network to which the user is connected.

7. The method according to claim 6, the verifying further comprising comparing the source of the request against application servers that match a user profile's filter criteria for a register event associated with the request.

8. The method according to claim 1, wherein the response further comprises user registration expiration information.

9. The method according to claim 8, the user registration expiration information comprising a same value or a decreased value of second user registration expiration information contained in the request.

10. The method according to claim 9, the response further comprising an expires header containing the user registration expiration information and the request comprising a second expires header containing the second user registration expiration information.

11. The method according to claim 1, the response further comprising a contact header generated by the network entity, the contact header comprising an identifier that helps correlate refreshes for the request.

12. The method according to claim 1, further comprising performing registration state notification procedures by the network entity after the generating of the response.

13. The method according to claim 1, wherein the network entity is a serving call session control function (S-CSCF).

14. An apparatus comprising:
   a receiver configured to receive a request from a source for information of a user;
   a verifier configured to verify that the source is authorized to receive the information, wherein the verifier is further configured to
      compare the source of the request against non-barred public user identities of the user,
      compare the source of the request against network entities identified in a path header contained in a previous request; and
   a generator configured to generate a response authorizing the request if the source is authorized to receive the information.

15. The apparatus according to claim 14, wherein the apparatus comprises a serving call session control function (S-CSCF).

16. A system comprising:
   a first network entity, the first network entity configured to send a request for information of a user; and
   a second network entity, the second network entity configured to receive the request for information of the user, to verify that the first network entity is authorized to receive the requested information by comparing the source of the request against non-barred public user identities of the user and by comparing the source of the request against network entities identified in a path header contained in a previous request, and to generate a response authorizing the request if the first network entity is authorized to receive the information.

17. An apparatus comprising:
   receiving means for receiving a request at a network entity from a source for information of a user;
   verifying means for verifying that the source is authorized to receive the information; and
   generating means for generating a response authorizing the request if the source is authorized to receive the information,
   wherein the verifying means further comprises comparing means for comparing the source of the request against non-barred public user identities of the user and for comparing the source of the request against network entities identified in a path header contained in a previous request.

18. The apparatus according to claim 14, wherein the information is registration information of the user.

19. The apparatus according to claim 14, wherein the request comprises a request for subscription to a registration state event package.

20. The apparatus according to claim 14, wherein the path header field includes proxy call session control function (P-CSCF) devices to which the user is attached.

21. The apparatus according to claim 14, wherein the response further comprises user registration expiration information.

22. The apparatus according to claim 21, wherein the user registration expiration information comprises a same value or a decreased value of second user registration expiration information contained in the request.

23. The apparatus according to claim 22, wherein the response further comprises an expires header containing the user registration expiration information and the request comprises a second expires header containing the second user registration expiration information.

24. The apparatus according to claim 14, wherein the response further comprises a contact header generated by the network entity, the contact header comprising an identifier that helps correlate refreshes for the request.

25. The apparatus according to claim 14, wherein the apparatus is further configured to perform registration state notification procedures after the generating of the response.

26. The apparatus according to claim 14, wherein the verifier is further configured to compare the source of the request against application servers not belonging to third-party providers outside a network to which the user is connected.

27. The apparatus according to claim 14, wherein the verifier is further configured to compare the source of the request against application servers that match a filter criteria of a user profile for a register event associated with the request.

28. The system according claim 16, wherein the second network entity is configured to verify that the first network entity is authorized to receive the requested information by comparing the source of the request against application servers not belonging to third-party providers outside a network to which the user is connected.

29. The system according claim 16, wherein the second network entity is configured to verify that the first network entity is authorized to receive the requested information by comparing the source of the request against application servers that match a filter criteria of a user profile for a register event associated with the request.

30. The apparatus according to claim 17, wherein the verifying means further comprises comparing means for comparing the source of the request against application servers not belonging to third-party providers outside a network to which the user is connected.

31. The apparatus according to claim 17, wherein the verifying means further comprises comparing means for comparing the source of the request against application servers that match a filter criteria of a user profile for a register event associated with the request.

32. A computer program, stored on a computer readable medium, the computer program configured to control a processor to perform a method comprising:

receiving a request at a network entity from a source for information of a user;

verifying that the source is authorized to receive the information; and generating a response authorizing the request if the source is authorized to receive the information, wherein the verifying further comprises comparing the source of the request against non-barred public user identities of the user and comparing the source of the request against network entities identified in a path header contained in a previous request.

33. The computer program according to claim 32, wherein the verifying further comprises comparing the source of the request against application servers not belonging to third-party providers outside a network to which the user is connected.

34. The computer program according to claim 32, wherein the verifying further comprises comparing the source of the request against application servers that match a filter criteria of a user profile for a register event associated with the request.

* * * * *